(12) United States Patent
Vishwakarma et al.

(10) Patent No.: US 12,007,035 B2
(45) Date of Patent: Jun. 11, 2024

(54) VARIABLE PRESSURE CONTROL VALVE

(71) Applicant: EATON INTELLIGENT POWER LIMITED, Dublin (IE)

(72) Inventors: Ashok Kalappa Vishwakarma, Maharashtra (IN); Swastik Balshiram Davkhar, Maharashtra (IN); Pushkar Prasad Gijare, Maharashtra (IN); Michael Leo Madlangbayan, Trabuco Canyon, CA (US); Andres Olmedo, Baldwin Park, CA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/977,851

(22) Filed: Oct. 31, 2022

(65) Prior Publication Data

US 2023/0147379 A1 May 11, 2023

(30) Foreign Application Priority Data

Nov. 5, 2021 (IN) .............................. 202111050731

(51) Int. Cl.
*F16K 17/30* (2006.01)
*B64F 1/28* (2006.01)
(Continued)

(52) U.S. Cl.
CPC ................ *F16K 17/30* (2013.01); *B64F 1/28* (2013.01); *F16K 1/126* (2013.01); *F16K 3/265* (2013.01);
(Continued)

(58) Field of Classification Search
CPC ........ F16K 17/00; F16K 17/025; F16K 17/04; F16K 1/126; F16K 3/262; F16K 3/265;
(Continued)

(56) References Cited

U.S. PATENT DOCUMENTS

| | | | | |
|---|---|---|---|---|
| 351,159 A | * | 10/1886 | Brengel | F16K 17/30 137/515.3 |
| 1,212,102 A | * | 1/1917 | Pipe | F16K 37/0008 137/553 |

(Continued)

OTHER PUBLICATIONS

Hose End Regulator to Mate 61428, 64348, 61429, 64349, 64200 & 64201 Nozzles, Maintenance Manual, Eaton Aerospace Group, Conveyance Systems Division, Carter® Brand Ground Fueling Equipment, 1-12 (Oct. 2009).
(Continued)

*Primary Examiner* — Kevin F Murphy
*Assistant Examiner* — Jonathan J Waddy
(74) *Attorney, Agent, or Firm* — Merchant & Gould P.C.

(57) ABSTRACT

The present disclosure relates to a valve assembly for controlling flow. The valve body has an inlet end and an outlet end. A piston is positioned within the valve body and is movable between an open position to open the valve body and a closed position to close the valve body. A spring is mounted between the piston and a spring adjustment member. A portion of the spring adjustment member is accessible through the inlet end of the valve body so as to be engageable by a tool to facilitate rotation of the spring adjustment member to vary compression of the spring to set a spring pressure rating.

12 Claims, 16 Drawing Sheets

(51) Int. Cl.
*F16K 1/12* (2006.01)
*F16K 3/26* (2006.01)
*F16K 27/04* (2006.01)
*F16K 37/00* (2006.01)

(52) U.S. Cl.
CPC ........ *F16K 27/041* (2013.01); *F16K 37/0058* (2013.01); *F16K 2200/304* (2021.08)

(58) Field of Classification Search
CPC ........ F16K 3/267; F16K 17/30; F16K 27/041; F16K 27/12; F16K 31/1221; F16K 37/0058; F16K 2200/304; B64F 1/28
USPC .................................. 137/220, 496, 517, 524
See application file for complete search history.

(56) References Cited

U.S. PATENT DOCUMENTS

| | | | | |
|---|---|---|---|---|
| 1,597,729 | A * | 8/1926 | Schettler | F02B 77/10 251/127 |
| 2,479,620 | A * | 8/1949 | Ingham, Jr. | A47J 27/09 137/542 |
| 2,725,891 | A * | 12/1955 | De Bourguignon | F16K 1/123 137/219 |
| 3,144,039 | A * | 8/1964 | Bloomquist | F16K 21/10 251/38 |
| 3,198,204 | A * | 8/1965 | Parks | F16K 31/383 251/44 |
| 3,234,961 | A * | 2/1966 | Arnes | B66F 3/42 60/466 |
| 3,285,281 | A * | 11/1966 | Pribonic | B60G 17/0528 137/625.25 |
| 3,359,998 | A * | 12/1967 | Fike | G05D 16/106 137/220 |
| 2010/0078081 | A1 * | 4/2010 | McKee | F16K 17/38 137/485 |
| 2018/0319514 | A1 | 11/2018 | More et al. | |
| 2020/0386336 | A1 * | 12/2020 | Gammon | G05D 16/106 |

OTHER PUBLICATIONS

Carter® Hose End Control Valves, Eaton Aerospace Group, Fluid & Electrical Distribution Division, 1-6 (Jun. 2013).

* cited by examiner

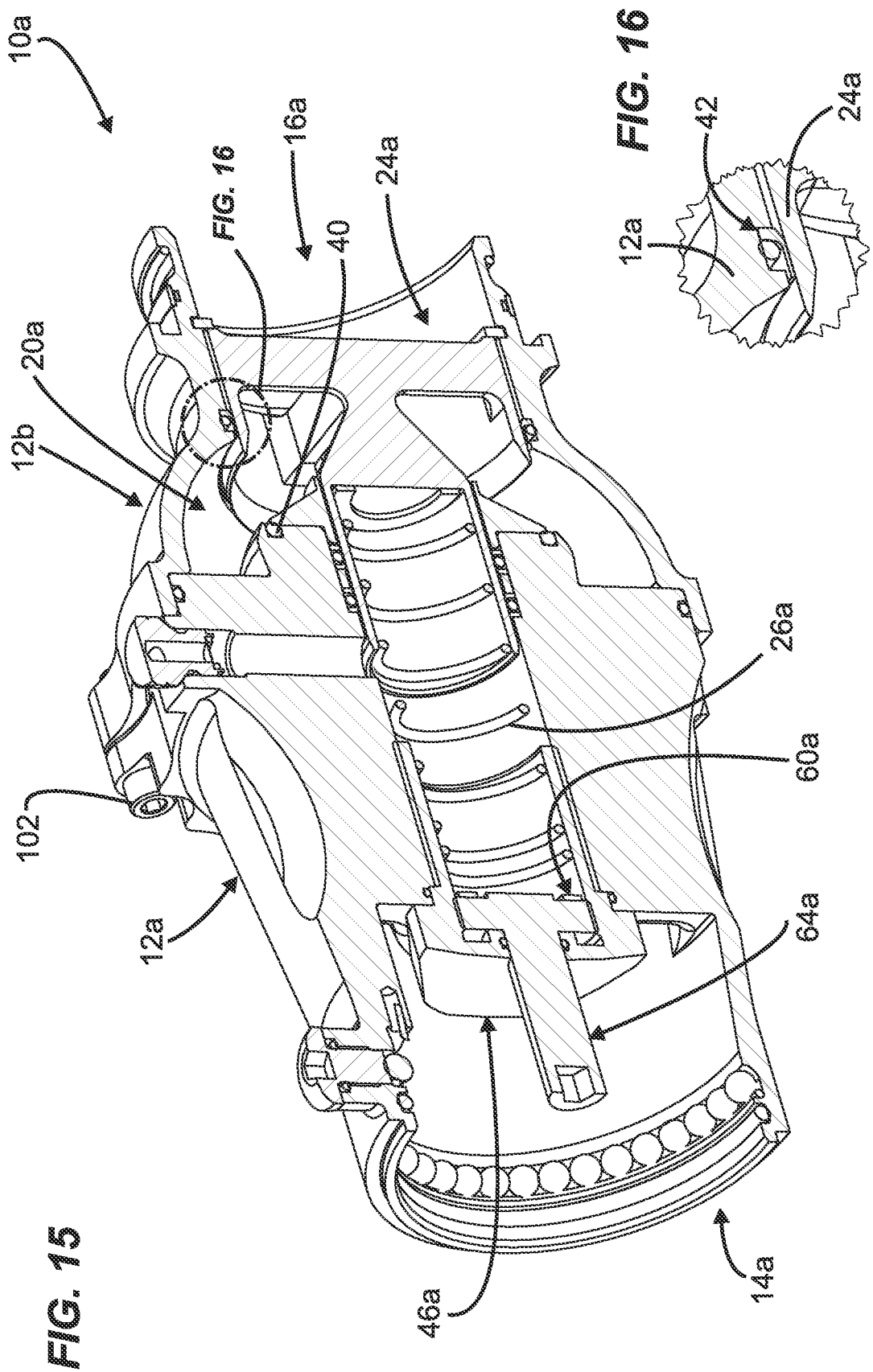

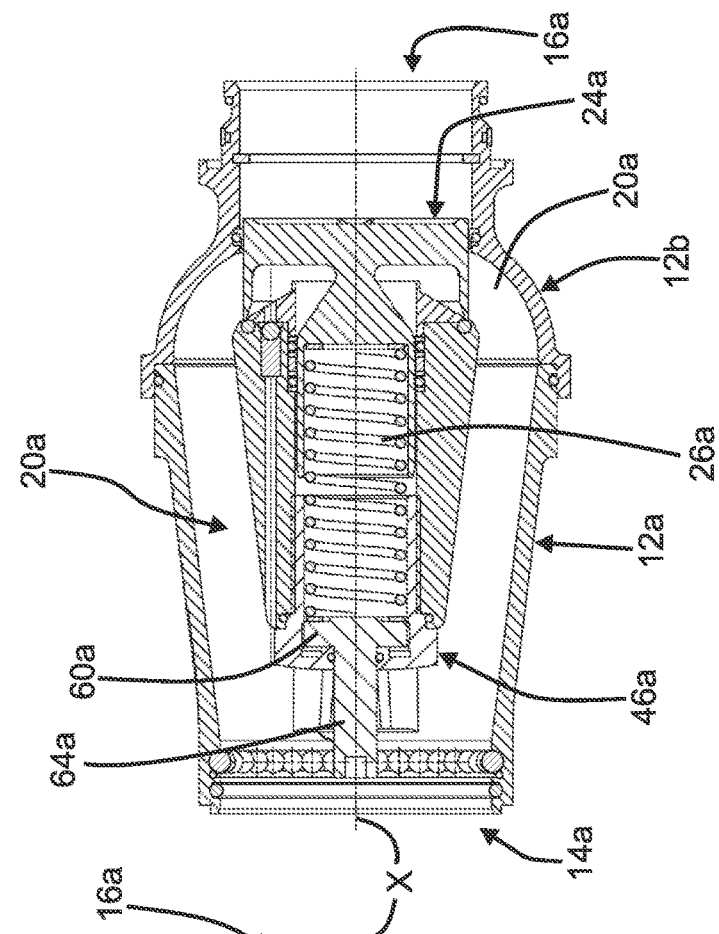
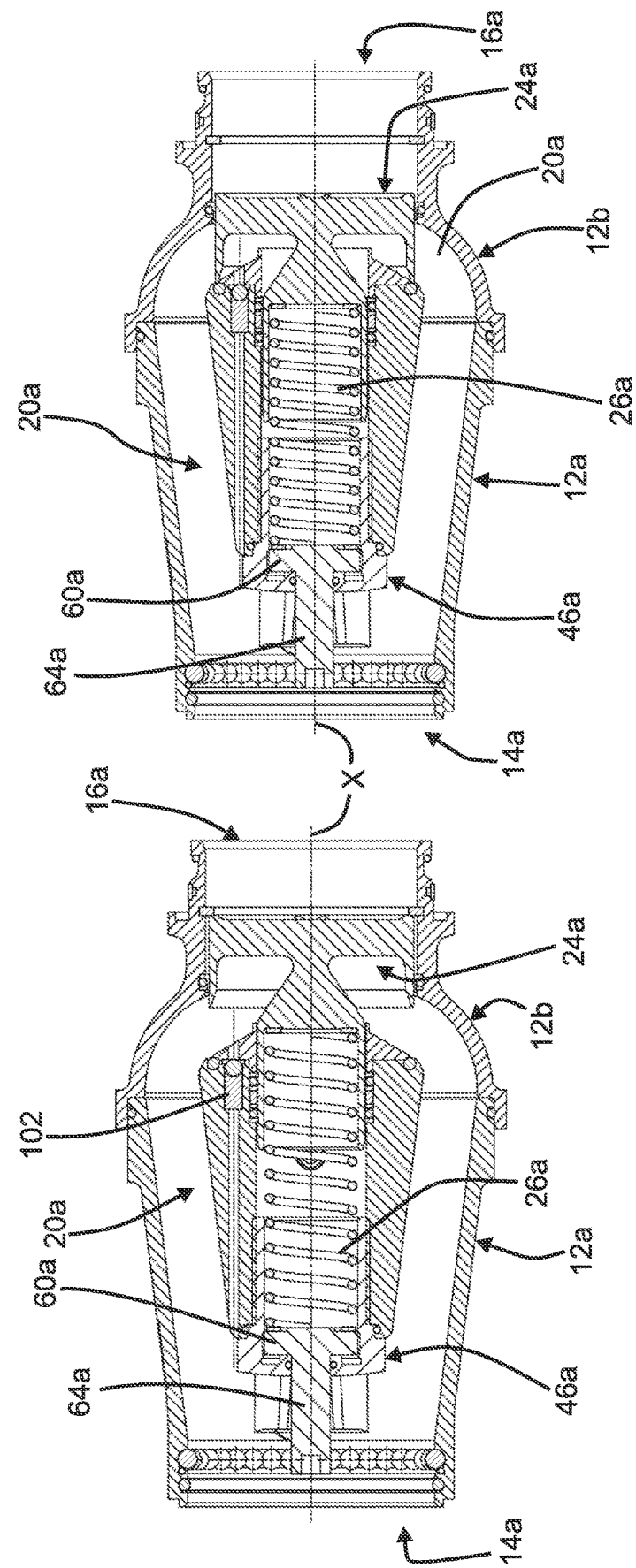

VARIABLE PRESSURE CONTROL VALVE

CROSS-REFERENCE TO RELATED APPLICATION

This application claims the benefit of Indian Provisional Patent Application No. 202111050731, filed on Nov. 5, 2021, the disclosure of which is incorporated herein by reference in its entirety.

TECHNICAL FIELD

The present disclosure relates generally to a system and method of controlling pressure conditions during fuel tank activities, specifically to pressure-operated control valves that respond to fuel pressure.

BACKGROUND

Various systems and devices are used to control back pressure during filling of aircraft fuel tanks. Aircrafts are adapted for inflight refueling and have a fuel duct or manifold that can lead to a number of separate fuel tanks.

In aircraft refueling operations, a service vehicle is connected to a refueling hose to pump fuel into an aircrafts fuel tanks. While connected, there may be fuel pressure in the fuel line. This fuel pressure is monitored and controlled by hose end control valves (HECV). The hose end control valves provide pressure limitation at an outlet to protect aircrafts from over pressurization and surge while refueling. The hose end control valves admit fuel into the fuel tank while open and automatically close in response to the rise in back pressure in the manifold or fuel duct when the fuel tank is full.

Hose end control valves are capable of operating at multiple pressure ratings. As such, customers can choose from a variety of pressure settings to tailor control systems to their requirements. These pressure settings are important to prevent damage to fuel tanks or dangerously high-pressure surges in the fuel line.

Typically, to change pressure settings of a HECV, the customer would disassemble the HECV in order to replace a spring inside the HECV chamber with a different spring that has a load requirement for achieving a different pressure setting. This can be time consuming and inefficient.

Accordingly, there is a need for a variable hose end control valve whereby various pressure settings are achievable simply and quickly without disassembling the hose end control valve.

SUMMARY

The present disclosure relates to variable Hose End Control Valves (HECVs) that provide pressure limitation to protect an aircraft while refueling. The variable HECV is a single device that can provide different pressure settings to tailor to a customer's control system without having to disassemble the HECV to replace an internal spring that achieves a different pressure setting. That is, unlike traditional HECVs that require the use of multiple springs to achieve different pressure ratings, the variable HECV has a compensator that can vary compression of a single spring allowing for spring adjustment within the variable HECV to achieve the desired pressure rating without disassembling the variable HECV.

One aspect of the present disclosure relates to a valve assembly for controlling fluid flow. The valve assembly includes a valve body that has an inlet end and an outlet end. The valve body defines a chamber and a piston is positioned within the chamber and is movable between an open position to open the valve body and a closed position to close the valve body. A spring is mounted (e.g., captured) between the piston and a spring adjustment member and functions to bias the piston toward an open position. A portion of the spring adjustment member is accessible through the inlet end of the valve body so as to be engageable by a tool to facilitate rotation of the spring adjustment member to vary compression of the spring for setting a spring pressure rating. In certain examples, back-pressure from the outlet end acts on the piston against the bias of the spring to move the piston to a closed position when the backpressure exceeds a pressure limit set by a load setting of the spring.

Another aspect of the present disclosure relates to a valve assembly for controlling flow from a pressurized source to a tank. The valve assembly includes a valve body that has an inlet end and an outlet end. The valve body defines fluid passages for receiving fluid flow between the inlet and outlet ends. A piston is mounted within the valve body to control the fluid flow. The piston is movable between an open position and a closed position. A cap member mounts at the inlet end of the valve body.

A compensator device is housed within the cap member. The cap member mounts the compensator device within the valve body. The compensator device is accessible through the inlet end of the valve.

A spring is between the piston and the compensator device. The spring biases the piston toward the open position and the spring is compressed when the piston moves to the closed position. One end of the spring can be received within the cap. The compensator device is configured to axially rotate relative to the cap to vary compression of the spring to achieve a desired spring pressure rating. In one example, the compensator device is coupled to the cap by a threaded connection. In one example, the cap can plug an end of a spring chamber (e.g., a centrally located passage in which the spring, the cap and the piston are at least partially positioned) adjacent the inlet end of the valve.

A further aspect of the present disclosure relates to a valve assembly for controlling flow of liquid from a pressured supply into a tank. The valve assembly includes a valve body that has an inlet end and an opposite outlet end. A piston is operative to close the valve assembly in response to a rise in fluid back pressure when a predetermined liquid level is reached in the tank. A spring is mounted (e.g., captured) between the piston and a spring adjustment member. A portion of the spring adjustment member is accessible through the inlet end of the valve body so as to be engageable by a tool to facilitate axial movement of the spring adjustment member to vary compression of the spring to achieve a spring pressure rating.

These and other features and advantages will be apparent from a reading of the following detailed description and a review of the associated drawings. A variety of additional aspects will be set forth in the description that follows. The aspects can relate to individual features and to combinations of features. It is to be understood that both the foregoing general description and the following detailed description are exemplary and explanatory only and are not restrictive of the broad concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

FIG. 4A is a cross-sectional view of the variable pressure control valve of FIG. 4 with a compensator set at a first pressure-setting position and the variable pressure control valve in an open position.

FIG. 4B is a cross-sectional view of the variable pressure control valve of FIG. 4 with the compensator set at the first pressure-setting position and the variable pressure control valve in a closed position.

FIG. 15 is a cross-sectional view of the variable pressure control valve of FIG. 13 showing a cap, a compensator device, spring and piston in accordance with the principles of the present disclosure.

FIG. 16 is an enlarged view of a portion of FIG. 15.

FIG. 20 is a cross-sectional view of the variable pressure control valve of FIG. 15 showing the piston in an open position and the compensator at a first pressure-setting position.

FIG. 21 is a cross-sectional view of the variable pressure control valve of FIG. 20 showing the piston in a closed position and the compensator at a first pressure-setting position.

DETAILED DESCRIPTION

The present disclosure relates to a variable pressure control valve designed to react to changes in outlet pressure to protect an aircraft during refueling. Pressure limiting is a function of a spring housed within the variable pressure control valve that loads a piston (e.g., a slidable member that can be pressure driven) to limit pressure sensed at the variable pressure control valve outlet.

The advantageous feature of the variable pressure control valve according to the present disclosure is the ability to provide a variety of pressure ratings suitable for refueling of fuel receiving tanks such as those mounted in airplanes. The variable pressure control valve eliminates the need for disassembly to change out one spring for another to achieve a different pressure setting. As such, it is not necessary to provide multiple springs or valves to tailor control systems to a customer's requirements. Rather, the variable pressure control valve of the present disclosure includes a spring adjustment member to change compression of a single spring to achieve varied pressure ratings without disassembly of the variable pressure control valve.

Figure 1:
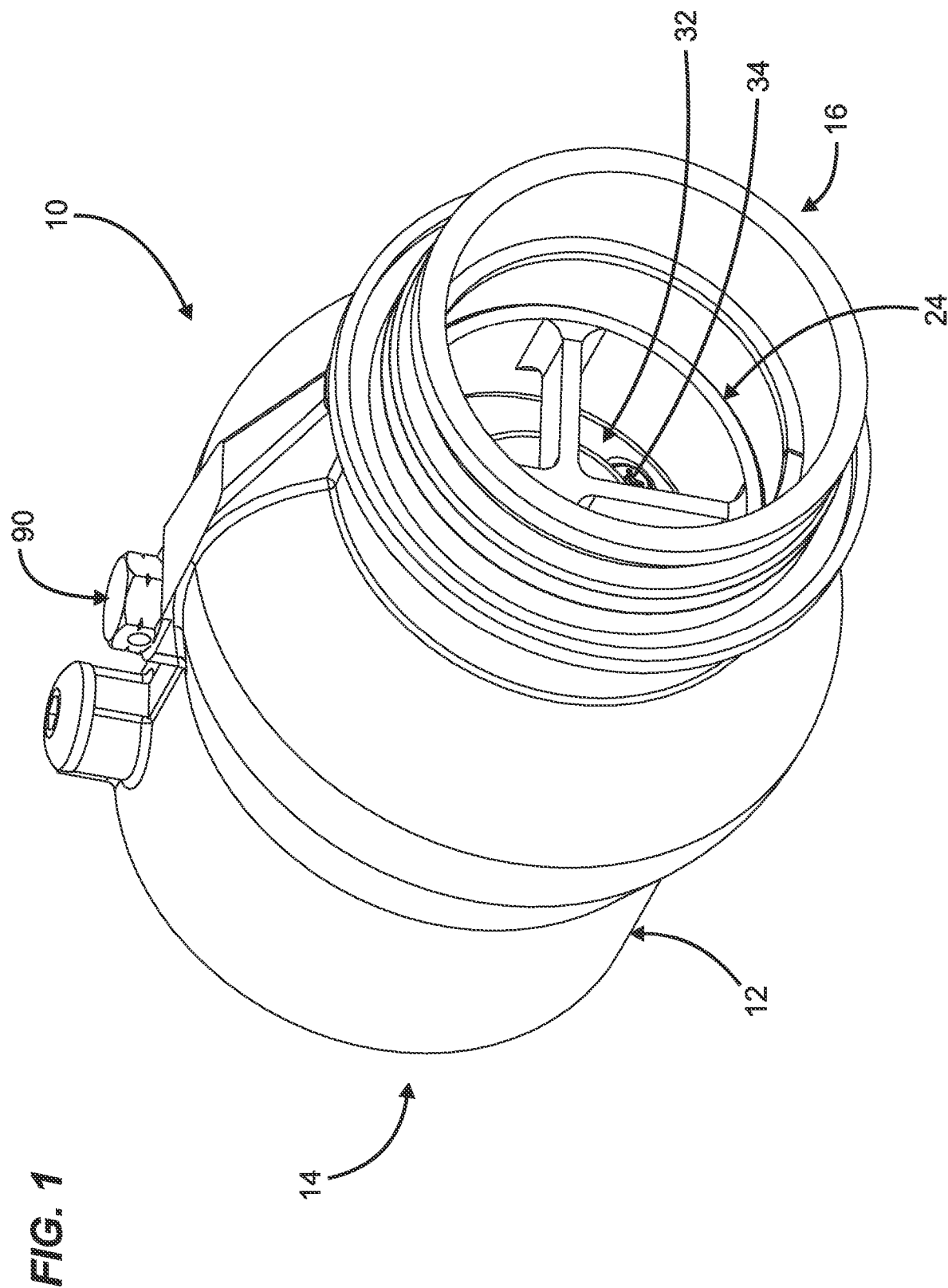
FIG. 1 is a perspective view depicting an outlet end of a variable pressure control valve in accordance with principles of the present disclosure.
Figure 2:
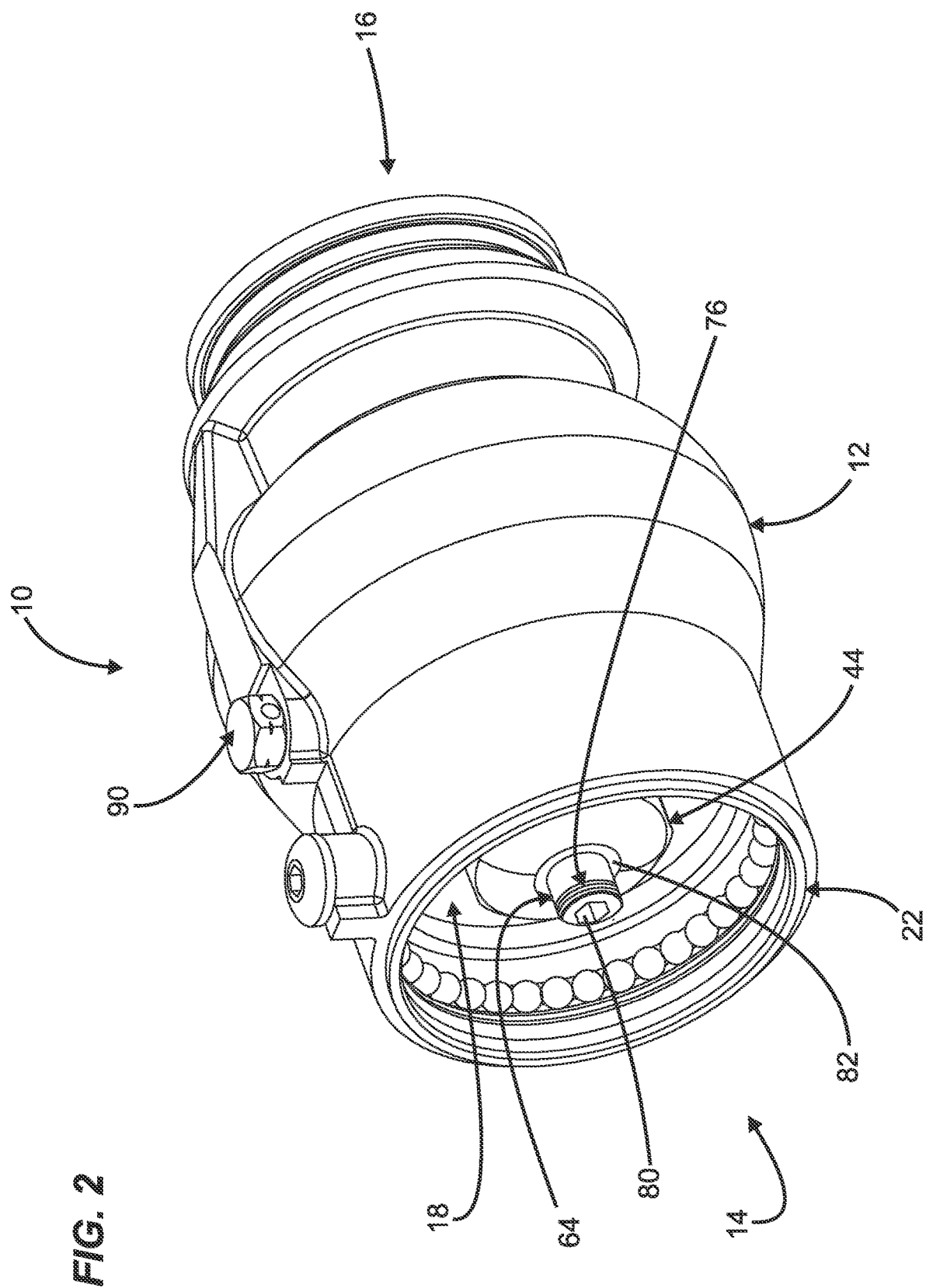
FIG. 2 is a perspective view depicting an inlet end of the variable pressure control valve of FIG. 1.
Figure 3:
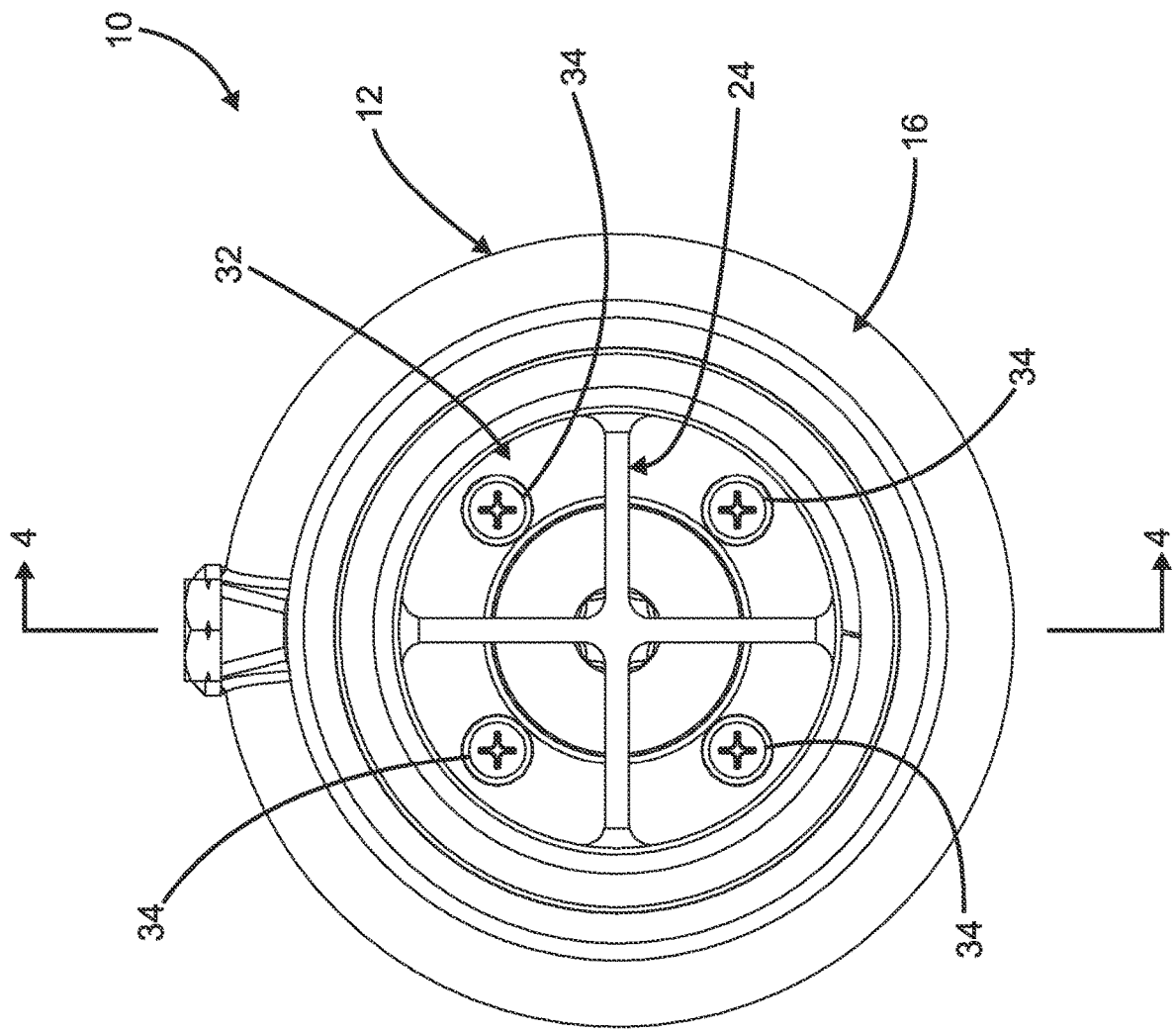
FIG. 3 is an outlet end view of the variable pressure control valve of FIG. 1.
Figure 13:
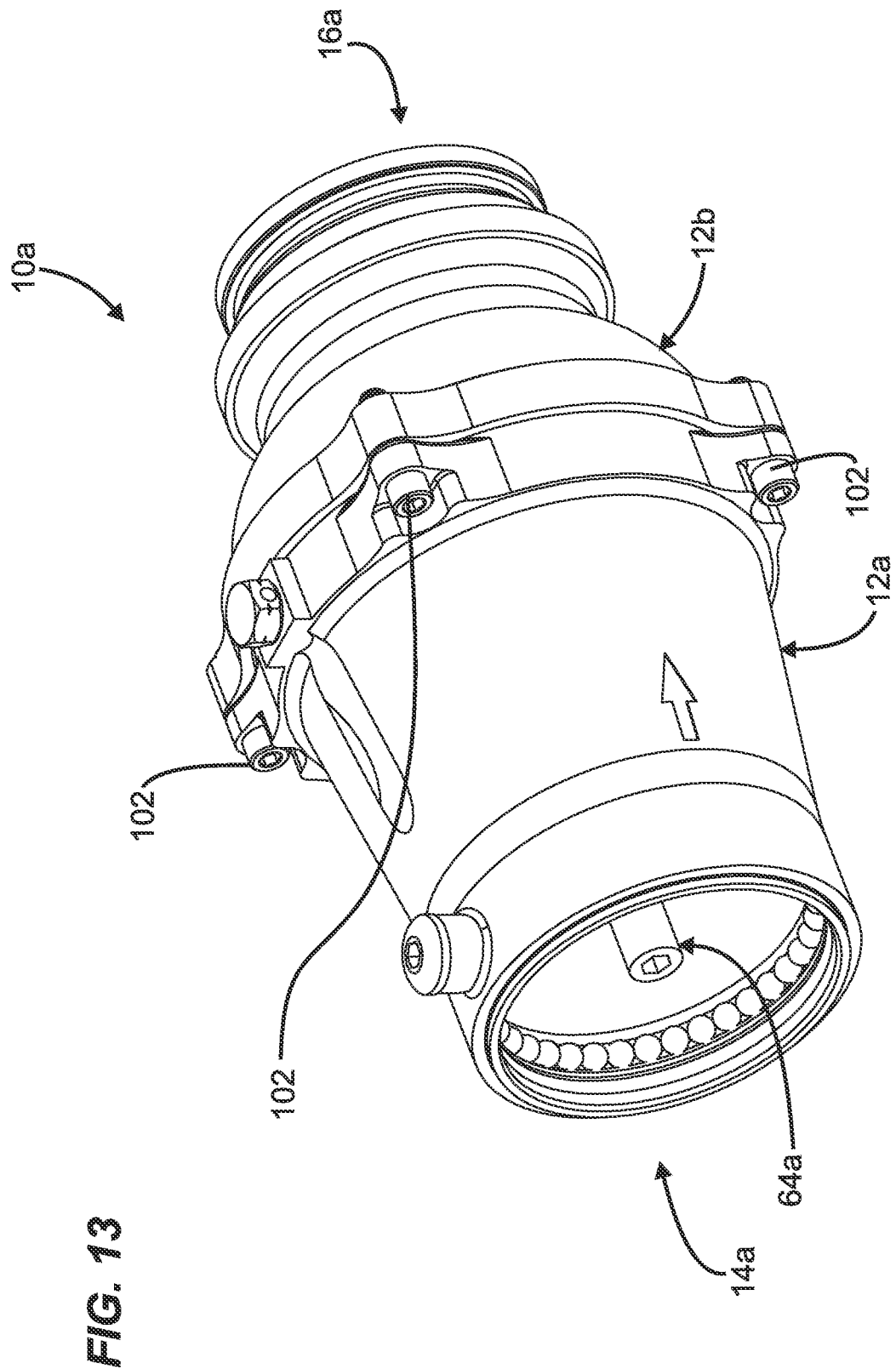
FIG. 13 is a perspective view of another example variable pressure control valve in accordance with the principles of the present disclosure, the example includes two housing pieces.

FIGS. 1-3 illustrate a variable pressure control valve 10 (e.g., a pressure regulator valve or a hose end control valve) in accordance with the principles of the present disclosure. The variable pressure control valve 10 includes a valve body 12 with an inlet end 14 and an opposite, outlet end 16. The valve body 12 is preferably formed of cast metal, such as, aluminum. In the example depicted, the valve body 12 is a single housing, although alternatives are possible. In other examples, the variable pressure control valve 10 may include two separate housing pieces (see FIG. 13).

The valve body 12 defines a fluid passage arrangement 18 with fluid passages 20 (see FIG. 4) for receiving fluid flow between the inlet and outlet ends 14, 16. The fluid passages 20 extend about a central region of the valve body as the passages 20 extend between the inlet and outlet ends 14, 16. The inlet end 14 of the valve body 12 is provided with a collar structure 22 for mating with a hose (not shown) of a fuel tank supply. A variety of inlet fittings (e.g., threaded fittings) or quick disconnect adapters are available to mate industry standard hose connections at the inlet end 14 of the valve body 12.

A nozzle (not shown), such as Eaton's Carter product line nozzle models 64348, 64200, 64201, or 64349, can be mated at the outlet end 16 of the valve body 12 to directly interface with an underwing of an aircraft for fueling. A variety of threaded outlet adapter fittings may also be available for alternative installations away from a nozzle.

The variable pressure control valve 10 includes a piston 24 visible through the outlet end 16 of the valve body 12. The piston 24 is slidably mounted within the valve body 12 between an open position (see FIG. 4A) and a closed position (see FIG. 4B). The piston 24 is configured to limit pressure sensed at the outlet end 16 of the valve body 12 or inlet of a nozzle on which the variable pressure control valve 10 is mounted. That is, the piston 24 is designed to react to changes of outlet pressure or back pressure on the aircraft side to close the valve if the back pressure reaches a predetermined level/limit during fueling with the predetermined level/limit being set by an amount of compression of a spring of the valve. The amount of compression of the spring can be adjusted via a compensator of the valve.

During fueling of a stationary aircraft, fuel under pressure from a fuel source is permitted to pass through a hose and the variable pressure control valve 10 connected thereto. Next, fuel passes through a fuel line and nozzle upon opening of the variable pressure control valve 10 to enter fuel tanks mounted under wings of the aircraft. The aircraft fuel tanks can be filled with fuel, at which point, the piston 24 of the variable pressure control valve 10 moves to the closed position to prevent further delivery of fuel into the fuel line. That is, while the fuel tanks are being filled to a desired level, fuel pressure in the line can rise such that the fuel will be forced to surge and the position of the piston 24 is moved to the closed position so as to cut off the flow of fuel. When fuel pressure is equalized again, the piston 24 can be opened in preparation of another fueling operation. The open position being the default state of the variable pressure control valve 10.

The variable pressure control valve 10 helps to maintain a desirable flow of fuel at a predetermined constant pressure. A typical pressure range can be from 35 to 50 pounds per square inch (psi). The variable pressure control valve 10 is designed to control pressure when the back or downstream fuel pressure becomes within range of its control.

Figure 4:
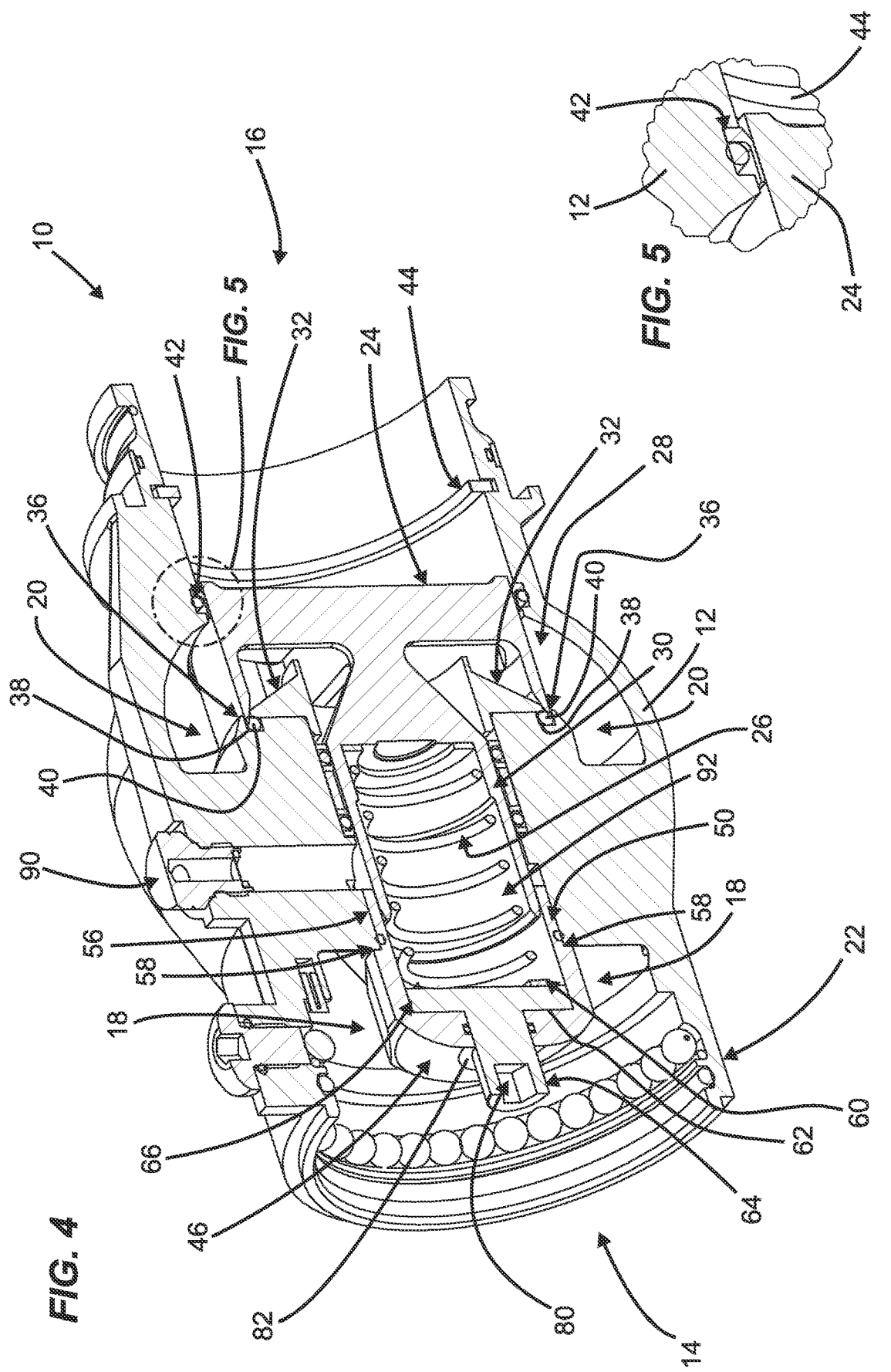
FIG. 4 is a cross-sectional view taken along line 4-4 of FIG. 3.

Turning to FIGS. 4, 4A, 4B cross-sectional views of the variable pressure control valve 10 is depicted. The variable pressure control valve 10 is configured to limit pressure as a function of a spring 26 mounted within the valve body 12. In certain examples, the spring 26 can be a helical compression spring that compresses on application of a load. The spring 26 loads the piston 24 of the variable pressure control valve 10. Biasing force exerted on the piston 24 is by the spring 26 which urges the piston 24 towards its open position. Back pressure changes during fueling can urge the piston 24 toward its closed position in opposition to the spring 26. That is, the piston 24 is operative to close the variable pressure control valve 10 in response to a rise in fluid back pressure when a predetermined liquid level is reached in the tank.

Figure 5:
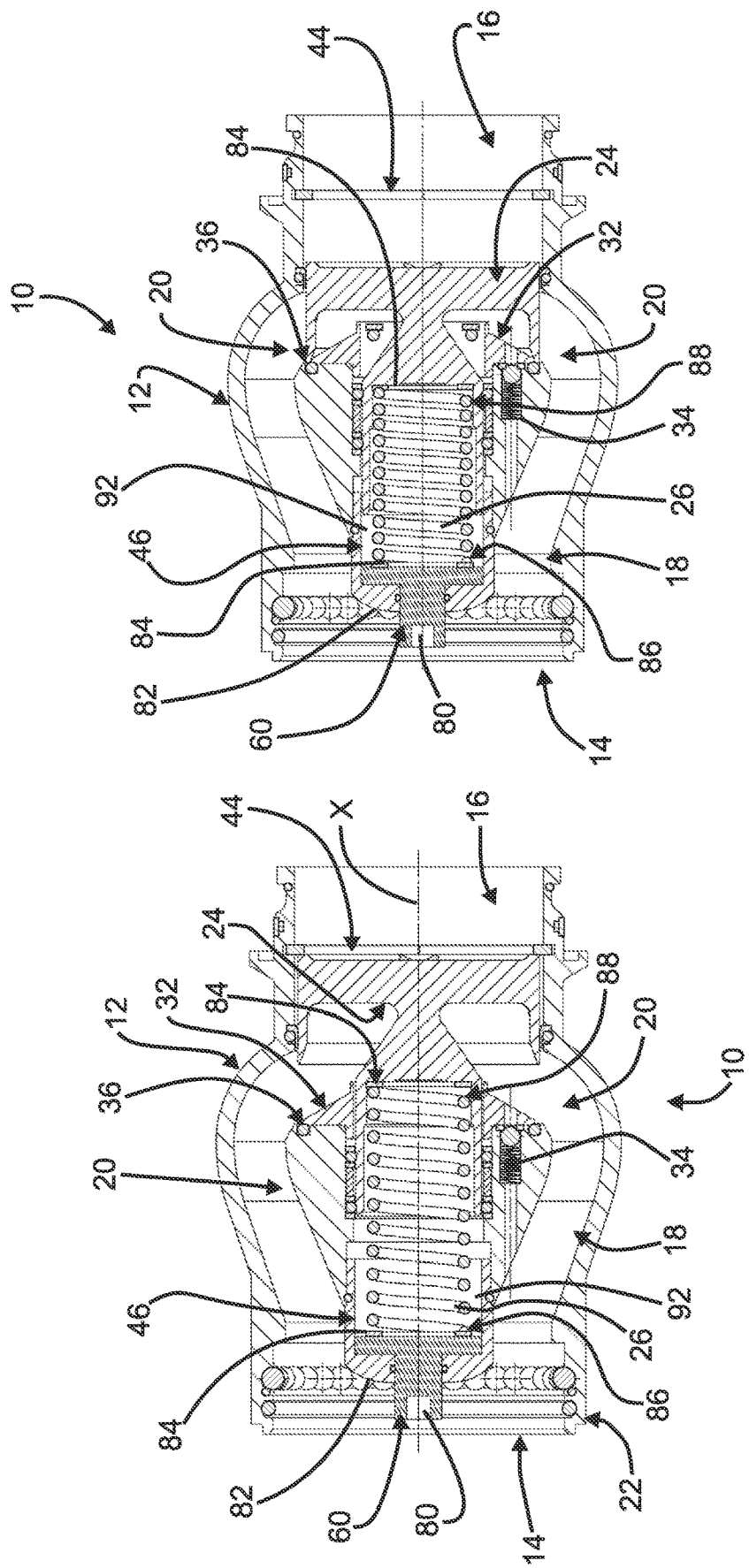
FIG. 5 is an enlarged view of a portion of FIG. 4.

The piston 24 can include a head portion 28 and a shaft portion 30. The variable pressure control valve 10 can include a fixed sleeve 32 bolted within the valve body 12 via fasteners 34 to support the shaft portion 30 of the piston 24. When the back pressure from the aircraft becomes within control of the variable pressure control valve 10, the piston 24 can be urged toward the closed position such that the head portion 28 bottoms out and seals against a shoulder 36 of the valve body 12. Once sealed, the piston 24 closes off the fluid passages 20 to stop the flow of fuel. The shoulder 36 can include circumferential grooves 38 for receiving O-ring type sealing members 40 or any other suitable sealing mechanism. The O-ring sealing members 40 can be made of Teflon or the like, a well-known material of low coefficient of friction. As depicted in FIG. 5, the piston 24 is supported relative to the valve body 12 via an annular, split spring ring 42 (e.g., a bearing that also provides sealing and can include an annular seal) and is limited in its sliding movement by a piston ring 44.

A hollow plug or cap 46 can be positioned within the valve body 12 adjacent the inlet end 14. A central spring passage (e.g., a spring cavity 92) is defined within the valve body 12 and is sealed relative to the passage arrangement 18. An end of the central spring passage adjacent the inlet end 14 of the valve body 12 is closed by the cap 46. In certain examples, the cap 46 can be in threaded connection with the valve body 12, although alternatives are possible. In other examples, the cap 46 may be connected to the valve body 12 via a quick disconnect assembly such as a snap ring.

Figure 6:
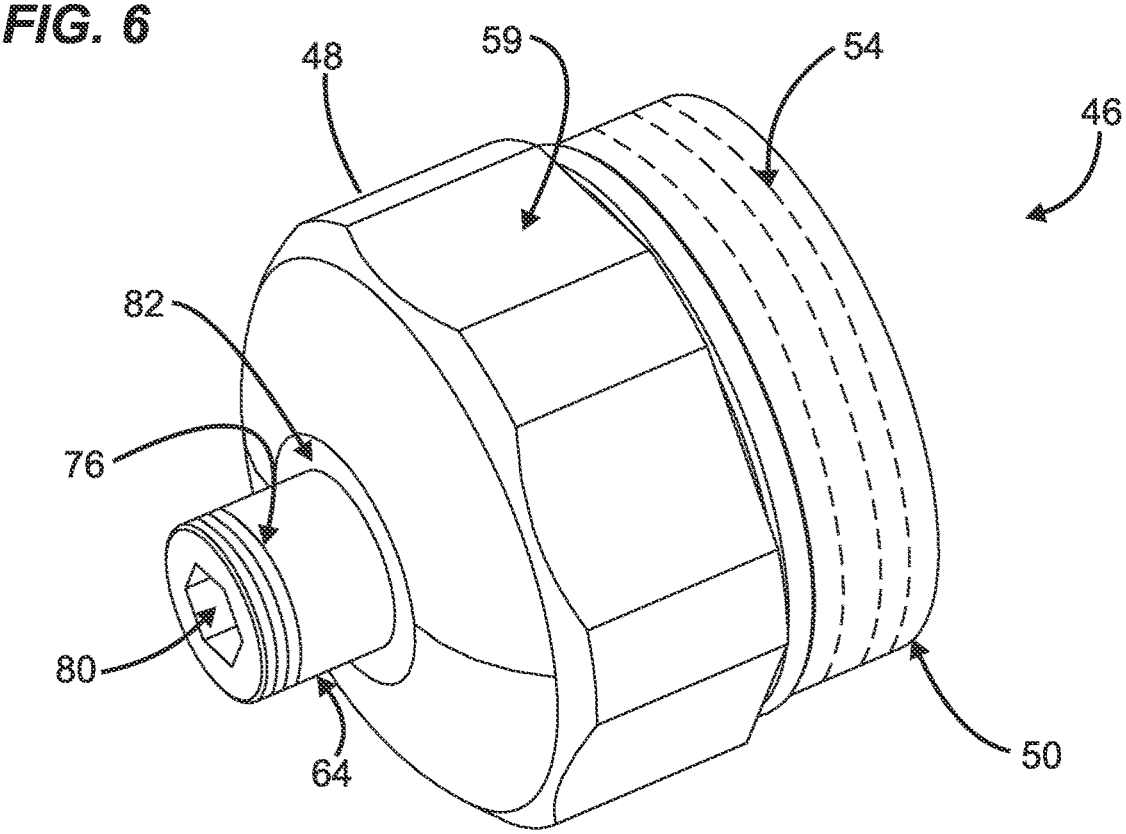
FIG. 6 is a perspective view depicting an inlet end view of a cap and compensator device in accordance with the principles of the present disclosure.
Figure 7:
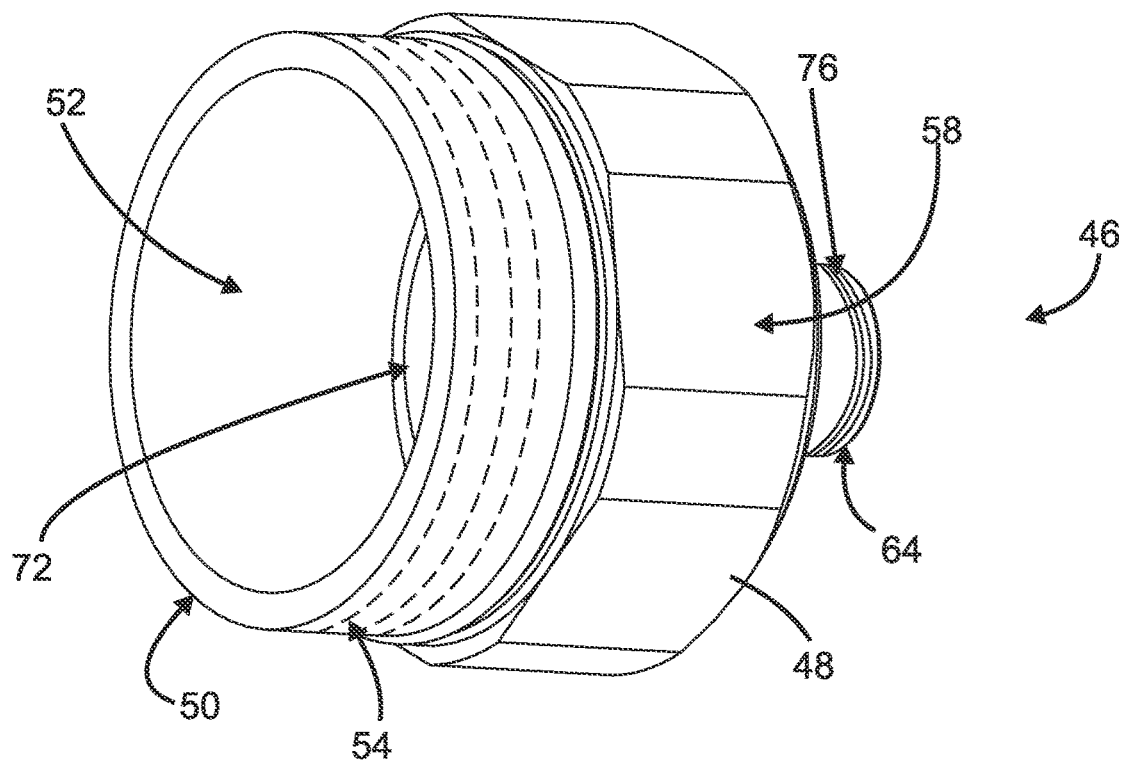
FIG. 7 is a perspective view depicting an outlet end view of the cap and compensator device of FIG. 6.
Figure 23:
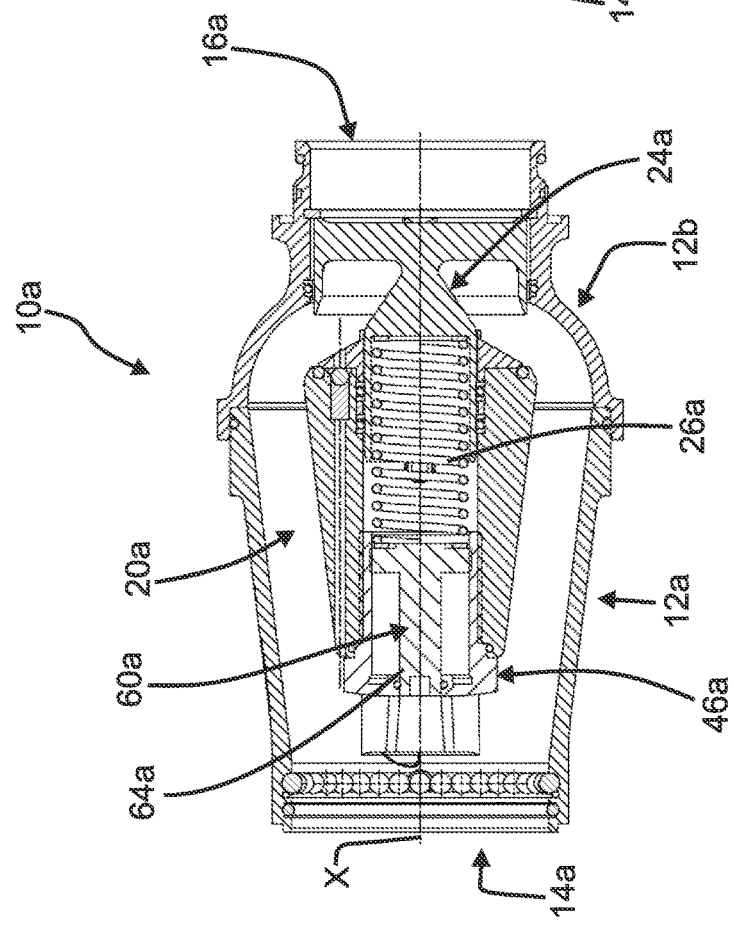
FIG. 23 is a cross-sectional view of the variable pressure control valve of FIG. 22 showing the piston in the closed position and the compensator device axially moved to the second pressure-setting position.

Turning to FIGS. 6-7, the cap 46 includes a main body 48 and an extension portion 50 that extends from the main body 48. The extension portion 50 of the cap 46 defines a cylindrical recess 52. In certain examples, when the cap 46 is connected to the valve body 12 and the piston 24 is in the closed position, the recess 52 can receive the shaft portion 30 of the piston 24 and can function as a piston guide or cylinder. In other examples, a shaft portion of a piston may not engage or contact a cap mounted in the valve body. For example, piston 24a shown in FIG. 23 does not engage or contact any portion of cap 46a when spring 26a is in a maximum compression state. An end of the spring 26 can be contained in the recess 52.

The extension portion 50 can be provided with external threads 54 that threadedly engage internal threads of the valve body 12 to provide a threaded connection 56 (see FIG. 4). For example, internal threads of the valve body 12 can be adjacent the inlet end 14 for receiving the extension portion 50 of the cap 46 to threadedly engage the external threads 54 thereof.

The main body 48 of the cap 46 has an external wrench interface 59 such as flats that permits applying torque to the cap 46 when connecting to the valve body 12. Once the cap 38 is completely secured within the valve body 12, the main body 48 of the cap 46 can be positioned flush with a shoulder 58 (see FIG. 4) of the valve body 12.

Figure 8:
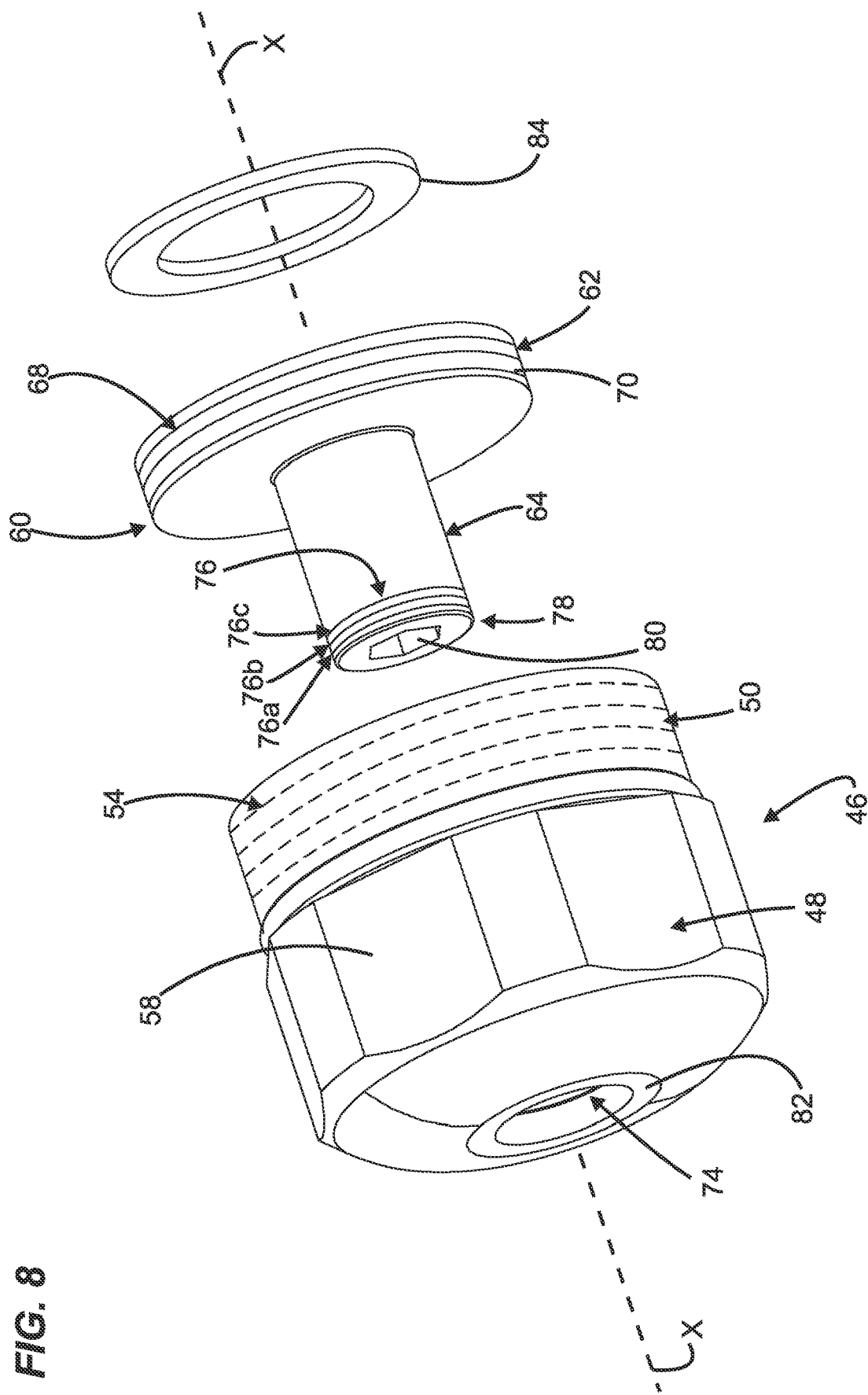
FIG. 8 illustrates an exploded view showing the compensator device of FIGS. 6 and 7 exploded from the cap.
Figure 9:
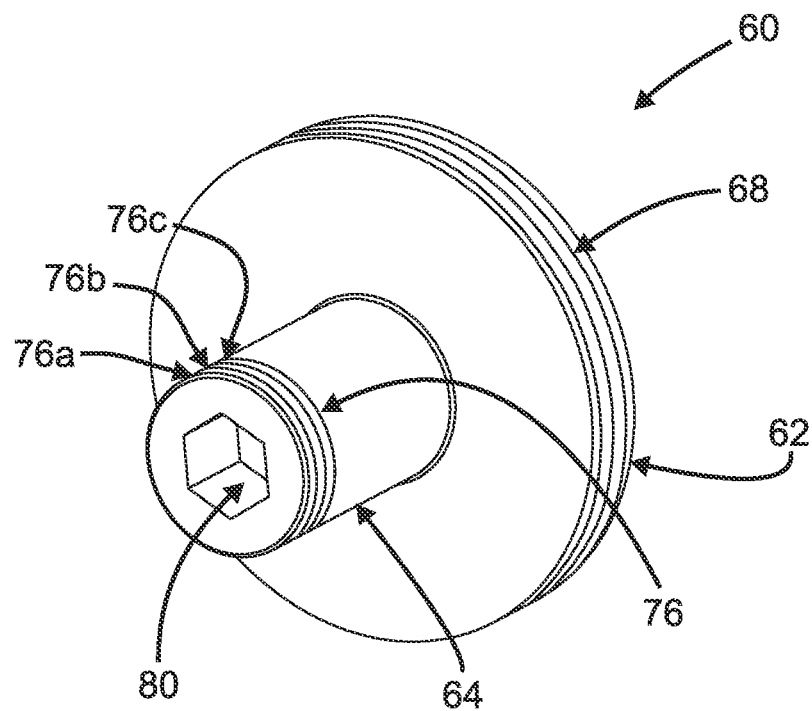
FIG. 9 illustrates the compensator device of FIGS. 6 and 7 from the perspective of the inlet end of the valve.
Figure 10:
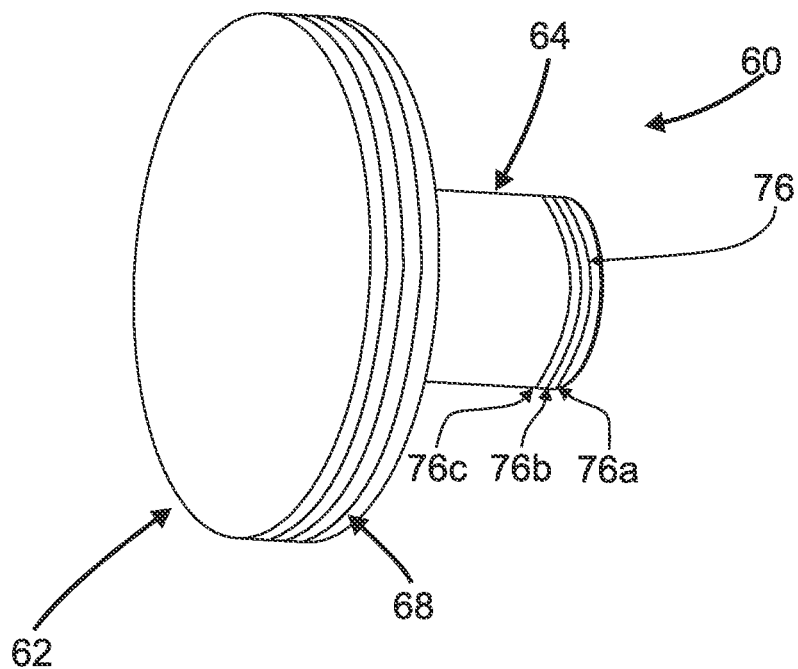
FIG. 10 illustrates the compensator device of FIGS. 6 and 7 from the perspective of the outlet end of the valve.

Turning to FIGS. 8-10, the variable pressure control valve 10 includes a compensator device 60 (e.g., an adjuster nut, a spring adjustment member) which can be mounted within the recess 52 of the cap 46. The compensator device 60 is generally T-shaped with a head portion 62 and a stem portion 64. The head portion 62 can be rounded, as shown. The compensator device 60 can be secured within the cap 46 via a threaded connection 66 (see FIG. 4). The head portion 62 can have fine pitch threads 68 formed on an outer surface 70 thereof to facilitate precision axial movement of the compensator device 60 within the cap 46. That is, the fine pitch threads 68 allow the compensator device 60 to be adjusted gradually or in small increments relative to the cap 46. The fine pitch threads 68 of the compensator device 60 threadedly engage internal threads 72 (see FIG. 7) formed in the cap 46 to provide the threaded connection 66. In one example, the threading between the cap 46 and the valve body 12 can be opposite threaded as compared to the threaded connection 66 between the compensation device 60 and the cap 46.

The main body 48 of the cap 46 defines an opening 74 for receiving the stem portion 64 of the compensator device 60. Thus, the stem portion 64 extends through the main body 48 and can be accessible at the input end 14 of the valve body 12 when the adapter/fitting is removed from the variable pressure control valve 10. A seal can be provided between the stem portion 64 and the cap 46 at the opening 74 for providing sealing between the cap 46 and the stem portion 64.

Referring again to FIG. 4A, the spring 26 is depicted with minimal load (e.g., zero load) being applied thereon. That is, the head portion 62 of the compensator device 60 can be bottomed out inside of the cap 46 to be flushed therewith such that zero load is applied on the spring 26. When the compensator device 60 is in this far left position relative to the cap 46, the spring has a 35 psi-compression rating. When it is desired to change the spring pressure rating to something higher, the compensator device 60 can be adjusted axially to apply a load on the spring 26 to meet customer control pressure requirements. Of course, depending upon application, springs having other ranges of pressure ratings could also be used.

Figure 11:
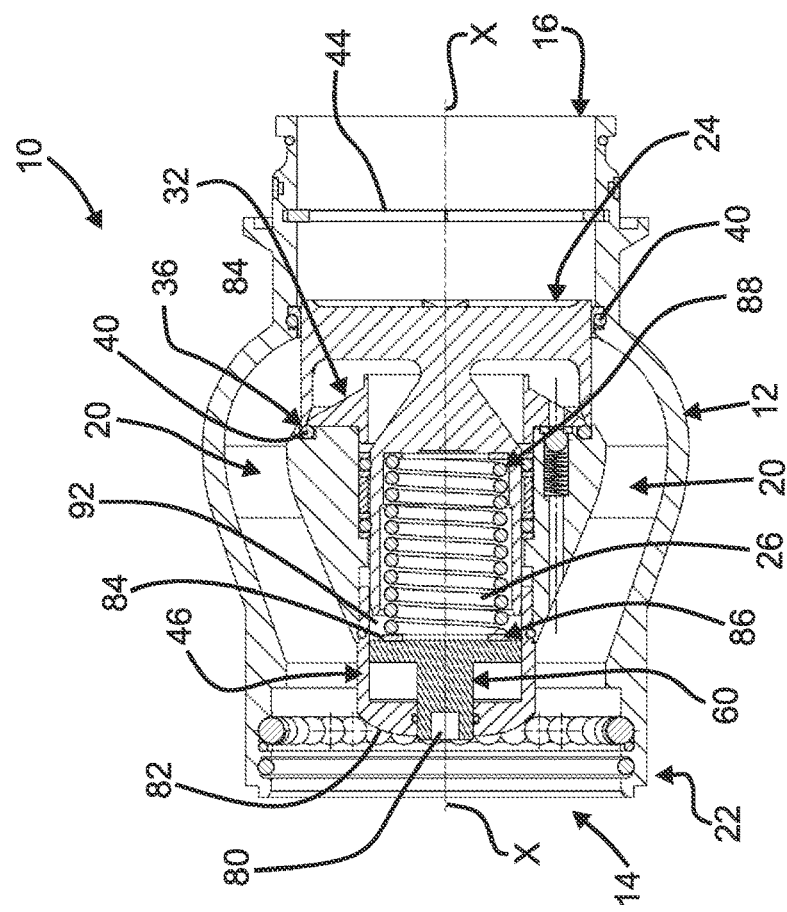
FIG. 11 is a cross-sectional view of the variable pressure control valve of FIG. 4 showing the valve in an open position with the compensator set at a second pressure-setting position.
Figure 12:
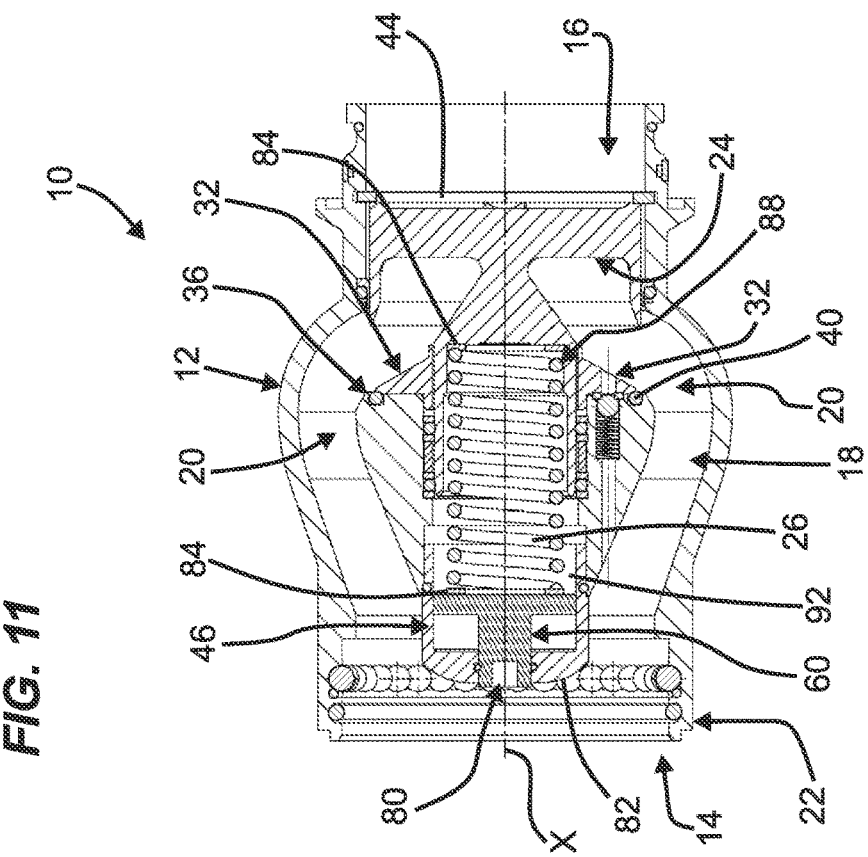
FIG. 12 is a cross-sectional view of the variable pressure control valve of FIG. 4 showing the valve in a closed position with the compensator set at the second pressure-setting position.

Referring to FIGS. 11-12, the spring 26 is biased between the compensator device 60 and the piston 24. The compensator device 60 is designed to control how much the spring 26 is pressurized by axially changing position of the compensator device 60 inside the cap 46. That is, the compensator device 60 can be turned clockwise or counterclockwise about a central axis X relative to the cap 46 to axially move from the bottomed-out position shown in FIG. 4A to compress the spring 26 to meet required pressure ratings. As such, the compensator device 60 eliminates the need to have separate springs with different pressure ratings for various applications. With the compensator device 60, a single spring 26 can be used to achieve different pressure ratings. As such, the variable pressure control valve 10 can be used with various applications without disassembly.

The stem portion 64 of the compensator device 60 can include a visual indicator 76 at a distal end 78 thereof. In certain examples, the visual indicator 76 includes multiple indication grooves 76a, 76b, 76c circumferentially defined on the stem portion 64 of the compensator device 60 to indicate a specific pressure setting, although alternatives are possible. For example, the indication grooves 76a-c can represent pressure ratings 45, 48, and 50 psi, respectively.

The stem portion 64 defines a torque transmitting feature 80 such as a hex feature adjacent the visual indicator 76 for turning the compensator device 60. The torque transmitting feature 80 of the compensator device 60 can be accessible through the inlet end 14 of the valve body 12 once an operator removes a hose fitting or adapter mounted on the variable pressure control valve 10. Once the hose adapter/fitting is removed from the inlet end 14 of the variable pressure control valve 10, an operator may take a tool, such as a screwdriver, wrench, or an Allen key, and insert it into the torque transmitting feature 80 of the stem portion 64 to threadedly adjust the compensator device 60 axially. The compensator device 60 can be turned or rotated clockwise or counterclockwise about the central axis X to make fine adjustments relative to the cap 46 to set the spring 26 to a desired pressure rating. Turning the compensator device 60 to either the left or right may either decrease the space between the compensator device 60 and the piston 24 so that the spring 26 is smaller (i.e., tight, compressed) or increase the space between the compensator device 60 and the piston 24 so that the spring 26 is larger (i.e., looser).

The compensator device 60 can be turned until the desired indication groove 76a-c is flush with an outer surface 82 of the cap 46 to set the spring pressure rating at either 45, 48, or 50 psi. The variable pressure control valve 10 can be adjusted in the field to achieve the spring pressure rate desired. For example, to set the variable pressure control valve 10 at 45 psi, the compensator device 60 can be adjusted from the position shown in FIG. 4A to a position in which the indication groove 76a is flush with the outer surface 82 of the cap 46 to set the spring 26 with a 45-psi compression rating.

To set the variable pressure control valve 10 at 48 psi, the compensator device 60 is adjusted by turning the Allen key in the torque transmitting feature 80 clockwise to axially move the compensator device 60 relative to the cap 46 until the indication groove 76b is flush with the outer surface 82 of the cap 46 to set the spring 26 with a 48-psi compression rating.

To set the variable pressure control valve 10 at 50 psi, the compensator device 60 continues to be adjusted axially about the central axis X until the indication groove 76c is flush with the outer surface 82 of the cap 46 to set the spring 26 at a 50-psi compression rating as shown in FIG. 11. FIG. 12 shows the spring 26 at its maximum 50-psi compression rating with the piston 24 in the closed position. When a maximum load (i.e., 50-psi compression rating) is applied on the spring 26, the head of the compensator device 60 is generally centered within the cap 46. FIGS. 4A and 4B show the spring 26 at its minimal 35-psi compression rating. One end of the spring 26 can be contained in the cap 46 while the opposite end of the spring 26 can be contained in the shaft portion 30 of the piston 24.

Teflon™ washers 84 can be positioned at opposing ends 86, 88 of the spring 26 to eliminate any friction or torsional influence on the compensator device 60 during operation. The overall length of the spring 26 between the compensator device 60 and the piston 24 or spring cavity 92 can be manipulated as shown in FIGS. 11 and 12 to achieve a desired pressure rating without any torsional influence.

The variable pressure control valve 10 may also include a breather plug 90 that is typically used during defueling operations. For example, the breather plug 90 allows the piston 24 to be blocked so that fuel can flow from the outlet end 16 toward the inlet end 14.

FIGS. 13-23 depict another example variable pressure control valve 10a in accordance with the principles of the present disclosure. The variable pressure control valve 10a has the same features as the variable pressure control valve 10 of FIGS. 1-12 except it includes a two-part valve body. As such, similar reference numbers will be used to describe like elements.

Figure 14:
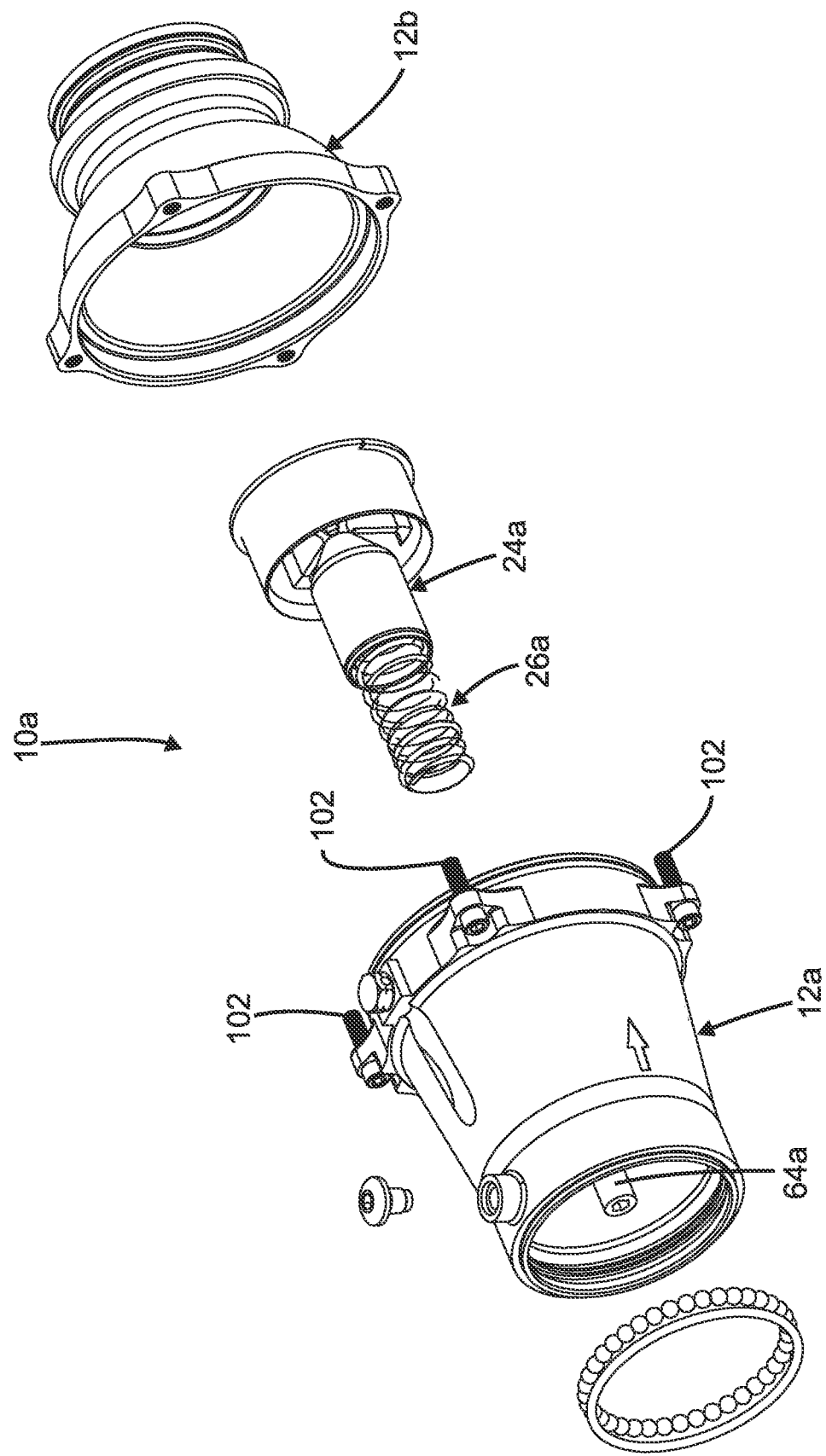
FIG. 14 is an exploded view of the variable pressure control valve of FIG. 13.
Figure 17:
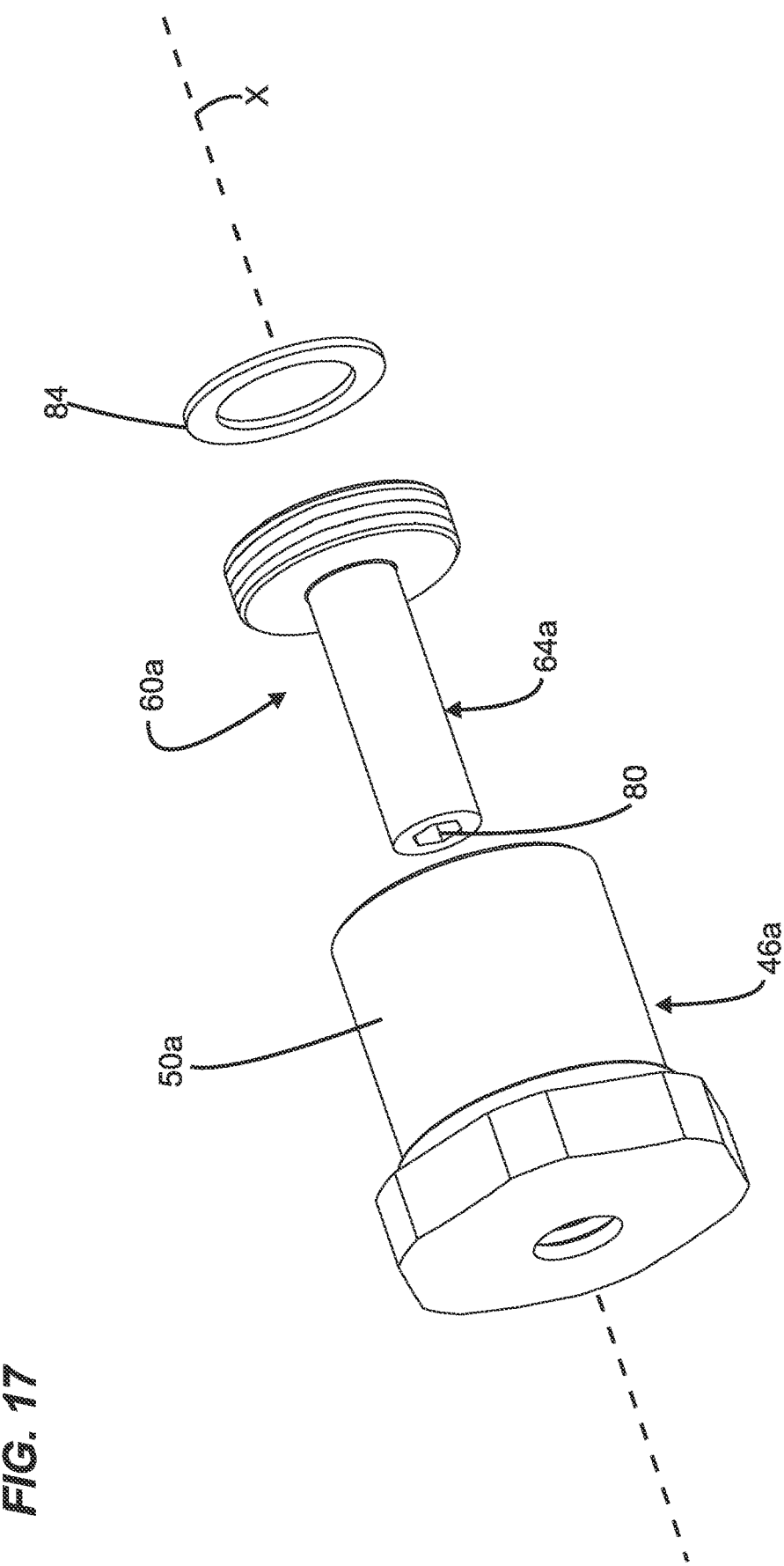
FIG. 17 is an exploded view showing the cap and compensator device of FIG. 15.
Figure 18:
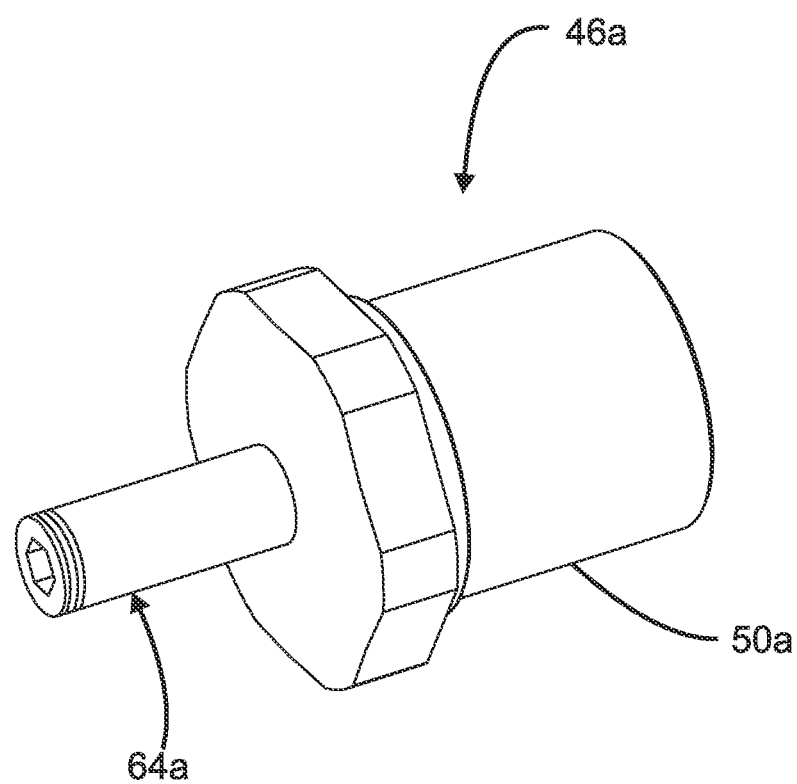
FIGS. 18-19 are perspective views illustrating the compensator device of FIG. 15 mounted within the cap.
Figure 19:
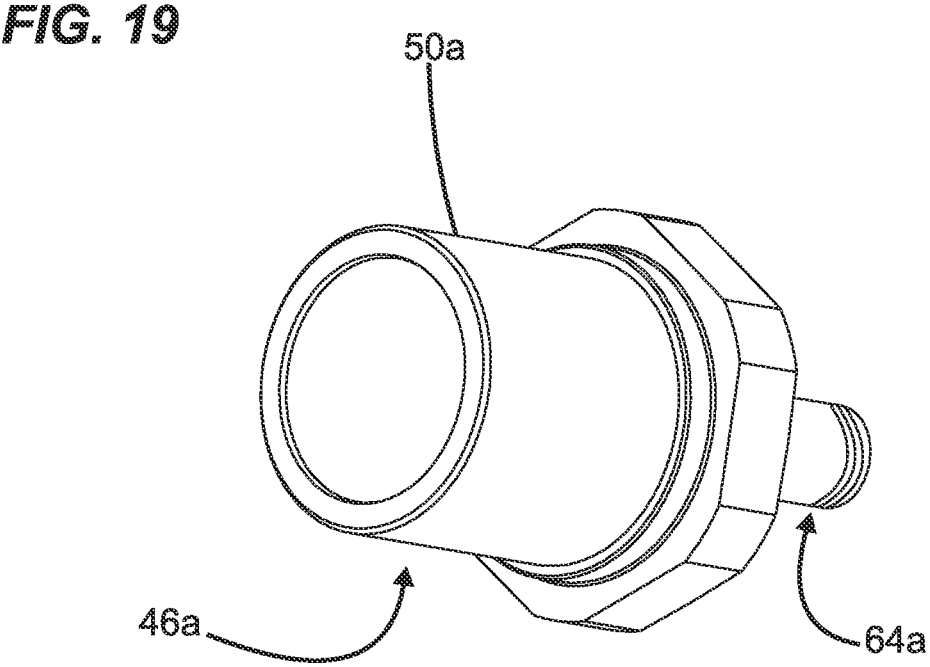
Figure 22:
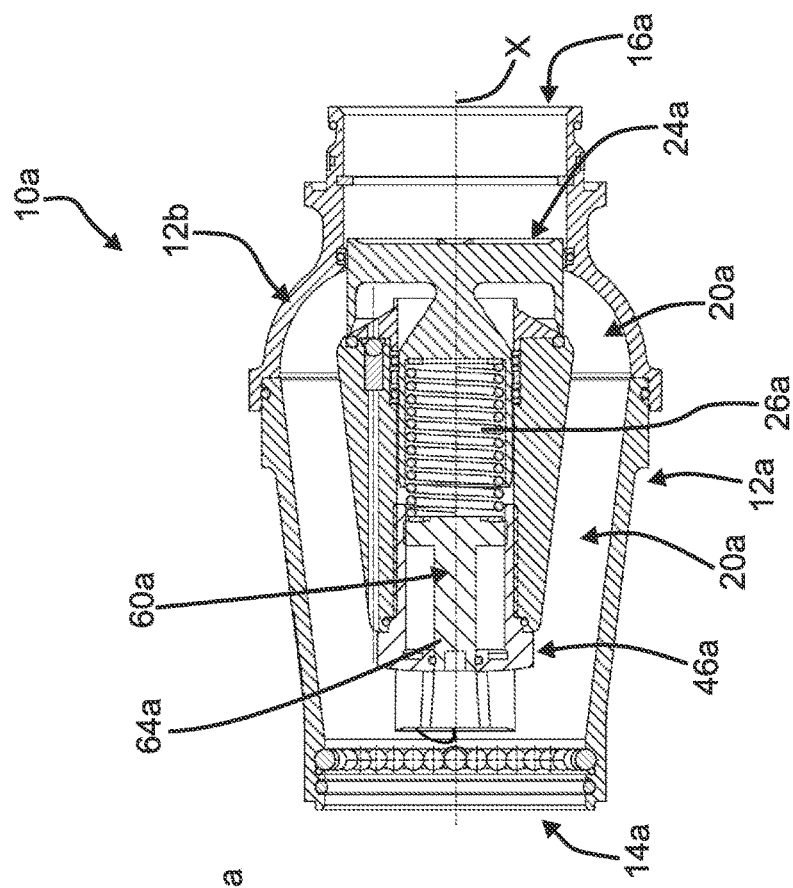
FIG. 22 is a cross-sectional view of the variable pressure control valve of FIG. 15 showing the piston in the open position and the compensator device axially moved to a second pressure-setting position to further compress the spring.

Referring to FIG. 14, the variable pressure control valve 10a includes a first valve housing piece 12a and a second housing piece 12b. The first and second valve housing pieces 12a, 12b are connected together via fasteners 102. The first and second valve housing pieces 12a, 12b can be machined pieces. The valve 10a has a more elongate configuration between opposite inlet and outlet ends 14a, 16a as compared to the valve 10. Passages 20a extend between the inlet and outlet ends 14a, 16a.

The variable pressure control valve 10a includes a piston 24a, a spring 26a, a cap 46a that mounts a compensator device 60a within the variable pressure control valve 10a as depicted in FIG. 15. As compared to the compensator device 60, the compensator device 60a has a longer stem 64a and the cap 46a has a longer extension portion 50a to accommodate a larger range of travel of the compensator device 60a relative to the cap 46a. Also, the spring 26a is longer than the spring 26. The variable pressure control valve 10a is configured to function similarly to the variable pressure control valve 10 of FIGS. 1-12. As such, the features of the piston 24a, the spring 26a, the cap 46a and the compensator device 60a will not be repeated for the sake of brevity.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A valve assembly for controlling flow of liquid from a pressured supply into a tank, the valve assembly comprising:
   a valve body having an inlet end and an opposite outlet end;

a piston operative to close the valve assembly in response to a rise in fluid back pressure when a predetermined liquid level is reached in the tank; and a spring mounted between the piston and a spring adjustment member, a portion of the spring adjustment member being accessible through the inlet end of the valve body so as to be engageable by a tool to facilitate axial movement of the spring adjustment member to vary a compression of the spring to achieve a spring pressure rating;

a spring chamber in which the spring is positioned; and a cap member that blocks one end of the spring chamber, wherein the spring adjustment member includes a stem that projects through the cap member and a head within the cap member that is axially adjustable within the cap member, and wherein the stem defines a torque interface end accessible through the inlet end of the valve body for changing its axial position.

2. The valve assembly of claim 1, wherein the tool is inserted into the torque interface end of the spring adjustment member to turn the spring adjustment member to increase or decrease space between the piston and the spring adjustment member between which the spring is compressed; and wherein the spring adjustment member includes a pressure rating indicator visible through the inlet end of the valve body to set the spring pressure rating.

3. The valve assembly of claim 1, wherein the valve body includes a first housing piece and a second housing piece.

4. The valve assembly of claim 1, wherein the valve body is cast from a single piece of metal.

5. The valve assembly of claim 1, wherein the spring extends through the spring chamber and has spring end portions housed within the cap member and the piston.

6. The valve assembly of claim 1, wherein the cap member has a threaded connection with the valve body.

7. The valve assembly of claim 1, wherein the head of the spring adjustment member has a threaded connection with the cap member, and wherein a seal is provided between the stem and the cap member.

8. A valve assembly for controlling flow from a pressurized source to a tank, the valve assembly comprising:

a valve body having an inlet end and an outlet end, the valve body defining fluid passages for receiving fluid flow between the inlet and outlet ends;

a piston mounted within the valve body to control the fluid flow, the piston being movable between an open position and a closed position;

a cap member that mounts adjacent the inlet end of the valve body;

a compensator device housed within the cap member, the compensator device being accessible through the inlet end of the valve body;

a spring mounted between the piston and the compensator device, wherein the spring biases the piston toward the open position, wherein the spring is compressed when the piston moves to the closed position;

wherein the compensator device is configured to axially rotate relative to the cap member to vary a compression of the spring to achieve a desired spring pressure rating; and wherein the cap member blocks one end of a spring chamber, wherein the compensator device includes a stem that projects through the cap member and a head that threads within the cap member, wherein the spring extends through the spring chamber and has spring end portions housed within the cap member and the piston, and wherein the stem includes a torque interface for allowing the compensator device to be turned relative to the cap member by a tool inserted through the inlet end of the valve body without requiring disassembly of the valve assembly to adjust the compression of the spring.

9. The valve assembly of claim 8, wherein the cap member has a threaded connection with the valve body.

10. The valve assembly of claim 8, wherein the compensator device includes a pressure rating indicator visible through the inlet end of the valve body to set the desired spring pressure rating.

11. The valve assembly of claim 8, wherein the valve body includes a first housing piece and a second housing piece.

12. The valve assembly of claim 8, wherein the valve body is cast from a single piece of metal.

* * * * *